(12) United States Patent
Fagley

(10) Patent No.: US 6,887,602 B2
(45) Date of Patent: May 3, 2005

(54) RAPID RESPONSE FUEL CELL SYSTEM

(75) Inventor: John C. Fagley, Victor, NY (US)

(73) Assignee: General Motors Corporation, Detroit, MI (US)

( * ) Notice: Subject to any disclaimer, the term of this patent is extended or adjusted under 35 U.S.C. 154(b) by 367 days.

(21) Appl. No.: 10/122,815

(22) Filed: Apr. 15, 2002

(65) Prior Publication Data

US 2003/0194587 A1 Oct. 16, 2003

(51) Int. Cl.$^7$ .......................... H01M 8/04; H01M 8/06
(52) U.S. Cl. .................... 429/17; 429/19; 429/23
(58) Field of Search ................. 429/17, 19, 23–26

(56) References Cited

U.S. PATENT DOCUMENTS

| | | | |
|---|---|---|---|
| 5,272,017 A | 12/1993 | Swathirajan et al. | 429/33 |
| 5,316,871 A | 5/1994 | Swathirajan et al. | 429/33 |
| 6,077,620 A | 6/2000 | Pettit | 429/26 |
| 6,232,005 B1 | 5/2001 | Pettit | 429/19 |
| 6,238,815 B1 | 5/2001 | Skala et al. | 429/17 |

FOREIGN PATENT DOCUMENTS

| | | | |
|---|---|---|---|
| JP | 60-240068 A | * | 11/1985 |
| JP | 2000-323161 A | * | 11/2000 |

OTHER PUBLICATIONS

English Translation for JP 60–240068 A (publication date of Nov. 1985).*
IPDL JPO Machine Translation of JP 2000–323161 A (publication date of Nov. 2000).*
JPO English abstract for JP 60–240068 A (publication date of Nov. 1985).*

* cited by examiner

Primary Examiner—Susy Tsang-Foster
(74) Attorney, Agent, or Firm—Cary W. Brooks

(57) ABSTRACT

Method and apparatus for supplying extra/booster steam and/or fuel vapor to the fuel processor of a fuel cell system during surges in power demanded from the fuel cell. Hot water and/or liquid fuel is/are stored under pressure until needed. When needed during power surges, the pressure is rapidly reduced on the hot liquid(s) causing it/them to flash vaporize and supplement the normal, steady state supply of steam/fuel-vapor to the fuel processor.

10 Claims, 1 Drawing Sheet

RAPID RESPONSE FUEL CELL SYSTEM

TECHNICAL FIELD

This invention relates to an apparatus and method for improving the response time of fuel cell systems during increases in power demand.

BACKGROUND OF THE INVENTION

Fuel cells have been used as a power source in many applications. Some fuel cells (e.g. PEM-type or phosphoric-acid-type) use hydrogen supplied to the anode as fuel, and oxygen supplied to the cathode as oxidant. The hydrogen can be provided directly from liquefied or compressed hydrogen, or indirectly from reformed hydrogen-containing fuels such as methane, methanol, gasoline or the like. The oxygen is typically provided from air.

PEM fuel cells are preferred for vehicular applications (i.e. as replacement for internal combustion engine) owing to their compactness, moderate temperature operation, and high power density. PEM fuel cells include a membrane electrode assembly (MEA) comprising a thin, protontransmissive, solid polymer electrolyte membrane (e.g. perfluoronated sulfonic acid) having an anode catalyst on one of its faces and a cathode catalyst on its opposite face. The MEA is sandwiched between a pair of electrically conductive current collectors that distribute the fuel cell's gaseous reactants over the surfaces of the respective anode and cathode. See U.S. Pat. Nos. 5,272,017 and 5,316,871, issued respectively Dec. 21, 1993 and May 31, 1994, and assigned to General Motors Corporation.

For vehicular applications, it is desirable to use a liquid, hydrogen containing fuel such as methanol or gasoline as the source of hydrogen, because it is easy to store onboard, and there is an existing, nationwide infrastructure capable of supplying such fuels. However, hydrogen-containing fuels (liquid or gaseous) must be dissociated to release their hydrogen content. The dissociation reaction is accomplished within a chemical reactor known as a fuel processor. Fuel and water vaporizers located upstream of the fuel processor convert water and liquid fuel to steam and fuel vapor respectively for supply to the fuel processor. The fuel processor contains one or more catalytic reactors wherein vaporized fuel reacts with steam, and sometimes air, to yield a hydrogen-rich reformate gas that is supplied to the fuel cell. In the steam reformation of methanol, methanol vapor and steam are reacted. In the reformation of gasoline, steam, air and gasoline vapor are reacted in a fuel processor known as an autothermal reformer (ATR). The ATR contains two sections, i.e. (1) a first, partial oxidation (POX) section where the gasoline is partially reacted exothermically with air, and (2) a second steam reformer (SR) section where the effluent from the POX section is exothermically reacted with steam. The effluents from both the methanol and gasoline reformation processes contain primarily hydrogen and carbon dioxide along with some water and CO. A water-gas-shift (WGS) reactor and/or a preferential oxidation (PROX) reactor may be provided downstream of the reformer to reduce the CO content of the hydrogen stream. See U.S. Pat. No. 6,232,005 (issued May 15, 2001), U.S. Pat. No. 6,077,620 (issued Jun. 20, 2000), and U.S. Pat. No. 6,238,815 (issued May 29, 2001), each assigned to the General Motors Corporation.

For vehicular applications, the fuel processor must be capable of delivering hydrogen to the fuel cell over a wide range of rates depending on the power demands placed on the fuel cell. In this regard, the fuel cell has to be able to power the vehicle over a broad spectrum of operating conditions ranging from when the vehicle is standing at idle (i.e. a low power demand condition) to when the vehicle is moving at high speeds (a high power demand condition), as well as transitions (e.g. rapid acceleration) therebetween (a very high power demand condition). Heretofore, the ability of the fuel processor to quickly respond to very high power demand transitions between low and high power demand conditions (hereafter "power surges") of the fuel cell has been hampered by the ability of the system to quickly produce enough vaporized fuel and/or steam for supply to the fuel processor. In this regard, it has not been considered practical to design a vehicular fuel cell system with vaporized fuel and steam reserves sized to accommodate power surges. Rather, the systems are typically sized to accommodate substantially steady state low and high power conditions, but not the power surges therebetween. Hence, transient response has suffered.

SUMMARY OF THE INVENTION

The present invention is a fuel cell system that includes fuel and/or steam buffer(s) that supplement(s) the system's primary fuel and/or water vaporizer(s) by rapidly responding to surges in the power demanded from the fuel cell. The buffer(s) supply(s) needed steam/fuel-vapor during power surges, and allow(s) time for the primary vaporizer(s) to catch-up, or increase its/their output sufficiently to meet the fuel vapor and/or steam requirements of the fuel processor after the power surge has ceased.

One aspect of the invention, apparatus-wise, involves a fuel cell system comprising (1) a hydrogen-consuming fuel cell, (2) a fuel processor that produces the hydrogen from a hydrogen-containing fuel and steam, and (3) a primary steam vaporizer that produces the steam from water and supplies a first quantity of the steam to the fuel processor at a first pressure. The invention is an improvement to the foregoing comprising a steam buffer that communicates with the fuel processor in parallel with the primary steam vaporizer for supplying a second, extra/booster quantity of steam to the fuel processor during surges in the electrical power demanded from the fuel cell. The steam buffer comprises a vessel containing a pool of water held under a second pressure greater than the first pressure and at an elevated temperature greater than the boiling point of water at the first pressure. A pump supplies water to the vessel at the second pressure, and a heat exchanger heats the water to the elevated temperature. An inlet valve communicates the pump with the vessel, and an outlet valve communicates the vessel with the fuel processor. A controller controls closing of the inlet valve and opening of the outlet valve during surges in the power demanded from the fuel cell to rapidly reduce the pressure in the vessel and thereby cause the heated water in the pool to flash vaporize and provide the second quantity of steam needed by the fuel processor to keep up with the rising power demands on the fuel cell.

A similar buffer may also be provided for generating extra hydrogen-containing fuel vapor from liquid hydrogen-containing fuel (e.g. gasoline). In this embodiment, the system's primary fuel vaporizer converts liquid fuel into fuel vapor and supplies a first quantity of the fuel vapor to the fuel processor at a first pressure. A fuel buffer communicates with the fuel processor fur supplying a second extra/booster quantity of fuel vapor to the fuel processor during surges in the electrical power demanded from the fuel cell The fuel buffer comprises a vessel containing a pool of liquid hydrogen-containing fuel held under a second pressure greater than the bubble point of the liquid hydrogen-containing fuel at the first pressure, where the bubble point is the temperature at which the lowest boiling constituent of a mixture of liquid hydrogen-containing fuels (e.g. gasoline is typically a mixture of low-boiling alkanes) begins to vaporize. A pump supplies the liquid hydrogen-containing fuel to the vessel at the second pressure, and a heat exchanger heats the liquid hydrogen-containing fuel to the elevated temperature. An inlet valve communicates the pump with the vessel, and an outlet valve communicates the vessel with the fuel processor. A controller controls opening and closing of the outlet and inlet valves during power surges to rapidly reduce the pressure in the vessel so as to cause the liquid hydrogen-containing fuel in the pool to flash vaporize and provide the extra/booster quantity of fuel vapor.

The invention further contemplates a method of operating a hydrogen-fueled fuel cell system having a fuel processor that produces the hydrogen from a hydrogen-containing fuel vapor and steam. The method comprises the steps of vaporizing water to provide a first quantity of steam to the fuel processor at a first pressure when operating the fuel cell at a first power level, and supplying a second extra/booster quantity of steam to the fuel processor in parallel with the first quantity to supplement the first quantity during surges in the electrical power demand to a higher power level. The second, extra/booster quantity of steam is provided from a pool of water maintained at a second pressure greater than the first pressure and at a temperature greater than the boiling point of water at the first pressure. When a power surge occurs, the pressure on the pool is rapidly reduced from the second pressure to the first pressure to flash vaporize the water in the pool and provide it to the fuel processor.

The invention is also applicable to a method for supplying fuel vapor to the fuel processor. This embodiment comprises the steps of vaporizing liquid fuel to provide a first quantity of fuel vapor to the fuel processor at a first pressure when operating the fuel cell at a first power level, and supplying a second, extra/booster quantity of fuel vapor to the fuel processor in parallel with the first quantity to supplement the first quantity during surges in the electrical power demand to a higher power level. The invention provides a pool of the liquid, hydrogen-containing fuel at a second pressure greater than the first pressure and at a temperature greater than the bubble point of the liquid fuel at the first pressure. When the power demand surges, the pressure on the pool is rapidly reduced from the second pressure to the first pressure to flash vaporize the fuel in the pool and provide it to the fuel processor.

Preferably, the water or fuel, as appropriate, will be maintained at, or near, its boiling or bubble point at the second pressure to more quickly produce the most extra/booster steam/fuel vapor possible when the pressure in the vessel is reduced. A preferred feature of the invention involves replenishing the pool by providing a two phase mixture of water/steam or liquid-fuel/fuel-vapor, as appropriate, to the vessel between power surges when the system is operating under substantially steady state conditions at either high or low power levels.

The invention will be better understood when considered in the light of the following detailed description of a preferred embodiment thereof which is given hereafter in conjunction with the drawing.

DESCRIPTION OF THE PREFERRED EMBODIMENT

Figure 1:
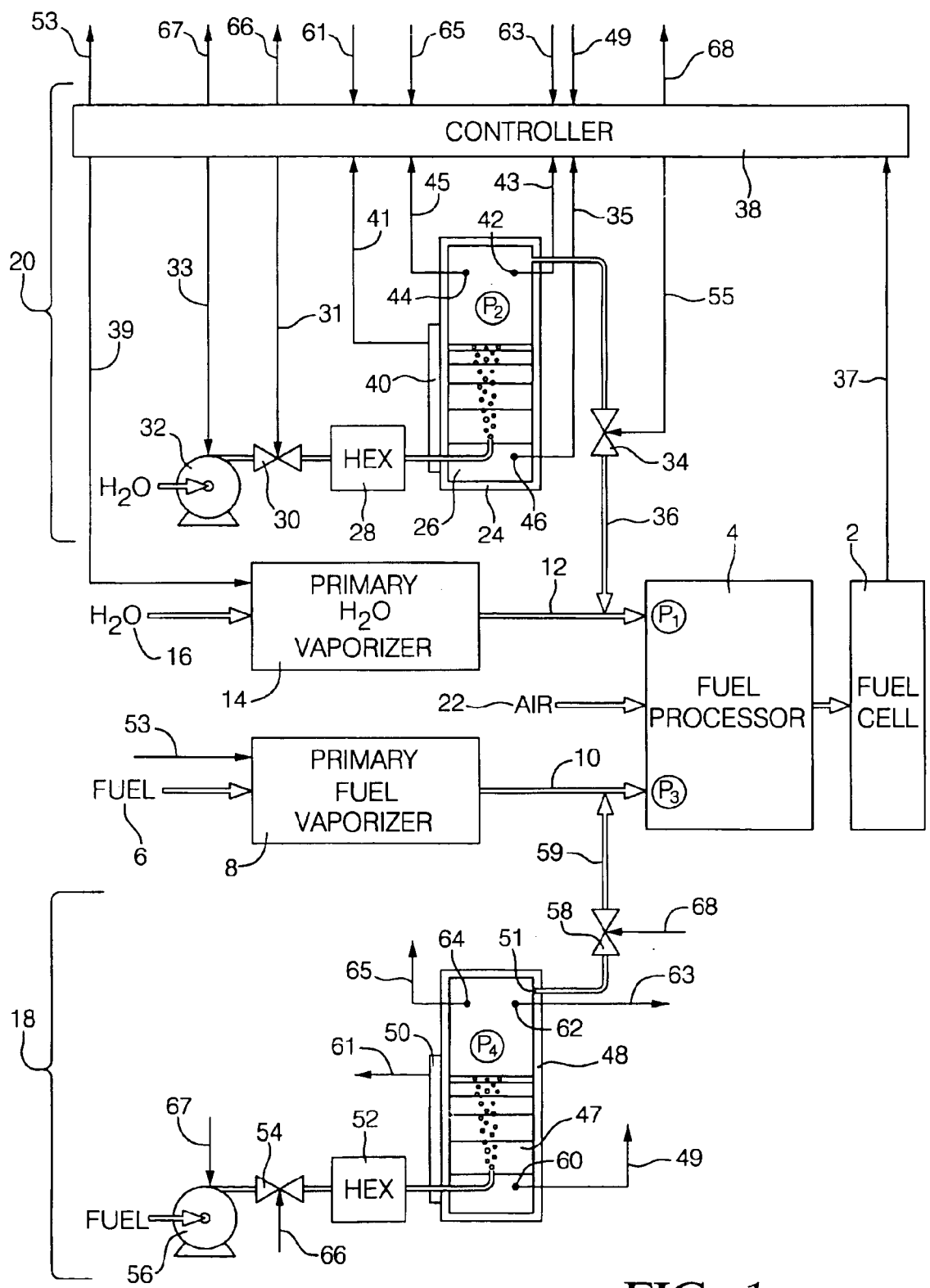
FIG. 1 schematically depicts a fuel cell system in accordance with one embodiment of the present invention.

The FIGURE depicts a fuel cell system comprising a fuel cell 2 and a fuel processor 4 for supplying hydrogen to the fuel cell 2. The fuel processor 4 catalytically reacts hydrogen-containing fuel 6 with steam 12, and possibly air 22, to form the hydrogen. When the hydrogen-containing fuel 6 is a liquid, it is first vaporized in a primary vaporizer 8 before being supplied to the fuel processor 4 via the pipe 10. If the hydrogen-containing fuel is a gas (e.g. methane), the primary fuel vaporizer 8 is eliminated and the gaseous fuel fed directly to the fuel processor 4. The primary fuel vaporizer 8 is sized to accommodate the fuel needs of the fuel processor 4 when the fuel processor is operating under substantially steady state low and high power conditions (i.e. between power surges). However, the time response of such a primary vaporizer 8 is relatively slow during a power demand surge such as may occur during the rapid acceleration of a fuel-cell powered vehicle. Similarly, steam 12 is also provided to the fuel processor 4 from a vaporizer 14 which vaporizes water 16. Like the fuel vaporizer 8, the water vaporizer 14 is sized to accommodate the low and high power, steady state condition, but its response will be slow during transient surges in power between the low and high power conditions. Air 22 may also be provided to the fuel processor 4 depending on the nature of the fuel 6. In this regard, if the fuel 6 were methanol, no air is needed. But if the fuel 6 were gasoline, it would typically be processed in an ATR-type fuel processor 4 that requires air for the POX reaction, as described above.

According to the present invention, any additional fuel and/or steam required by the fuel processor 4 during surges over and above that available from the primary vaporizers 8 and 14 is/are provided by a fuel buffer system 18 and/or a steam buffer system 20.

The steam buffer 20 includes a pressure vessel 24 containing a pool of water 26, a heat exchanger 28 for heating the water 26, a pump 32 fur pumping water under pressure into vessel 24, an inlet valve 30 communicating the pump 32 with the heat exchanger 28 and vessel 24, and an outlet valve 34 communicating the vessel 24 with the fuel processor 4 via pipe 36 to provide booster steam to the fuel processor 4 in parallel with the steam 12 from the primary water vaporizer 14. The heat exchanger 28 may either be a discrete heat exchanger, as shown, or integrated with the vessel 24 (not shown). The inlet and outlet valves 30 and 34 are motor actuated in response to control signals 31 and 55 emanating from a controller 38, as will be discussed in more detail hereinafter. A liquid level sensor 40, associated with the vessel 24, senses the level of the liquid in the pool 26 and reports it to the controller 38 via signal 41. Any convenient type of liquid level sensor or gauge (e.g. a float switch, or electrical resistance type) may be used. A thermocouple 42, and pressure sensor 44, at the top of the vessel 24 are used to measure the temperature and pressure of the fluid thereat where it exits the vessel 24 and report those measurements to the controller 38 via signals 43 and 45 respectively. Additional thermocouples (not shown) may be provided at different levels within the vessel 24, above the surface of the pool 26, to indicate the temperatures thereat. A thermocouple 46 provided in the lower portion of the vessel 24 indicates the temperature of the water in the pool 26 and reports it to the controller 38 via signal 35.

A more compact, alternative structure has the primary steam vaporizer 14 integrated into the heat exchanger 28 such that all of the steam generated passes through the pool 26.

In the operation of the steam buffer 20, the vessel 24 is filled with water 26 that has been heated to a temperature, and pressurized to a pressure determined by the operating conditions of the fuel processor 4. For example, if the primary vaporizer 14 supplies steam to the fuel processor 4 at pressure $P_1$, the pressure $P_2$ in the vessel 24 will be maintained significantly higher than the pressure $P_1$, and the temperature of the water in the pool 26 in the vessel 24 will be maintained above the boiling point of water at pressure $P_1$. Preferably, the temperature of the water in pool 26 will be at or near the boiling point of water at pressure $P_2$ for optimum steam buffering. When the fuel cell is operating at substantially steady state conditions (i.e. between power surges), the inlet valve 30 is mostly open (e.g. 95%), the outlet valve 34 is mostly closed (e.g. 95%), and the pump 32 pumps the water into the vessel 24 at pressure $P_2$. When the fuel cell is operating at substantially steady state and the level of the water in the pool 26 in the vessel 24 is below a prescribed level, fresh water is added to the pool 26 until the prescribed level is reached. To this end, the pump 32 pumps more water through the heat exchanger 28 than the heat exchanger 28 can completely vaporize so that a two-phase water-steam mixture exits the heat exchanger 28. When the fuel cell is operating at substantially steady state, heated water collects in the pool 26 while the vapor collects above the pool 26 and bleeds slowly past the valve 34 into the fuel processor 4 along with the steam from the primary steam vaporizer 14. When the water in the pool 26 reaches the prescribed level, the flow rate of water to the heat exchanger 28 is slowed to the point where only steam exits the heat exchanger 28. The steam exiting the heat exchanger bubbles up through the pool 26 to heat the water therein. Hence, both water and heat are added back into the pool 26 and vessel 24 to compensate for the water and heat lost during a power surge and corresponding buffering event. The pressure $P_2$ will be below its prescribed level immediately after a power surge, but will build back up again between surges.

The controller 38 monitors (1) the output (i.e. current and voltage) from the fuel cell 2 via signal 37, (2) the temperature and pressure at the top of the vessel 24 via signals 43 and 45 from sensors 42 and 44, (3) the level of the water in pool 26 via signal 41 from level sensor 40, and (4) the temperature of the pool 26 via signal 35 from thermocouple 46. When the output from the fuel cell 2 indicates a surge in the power demanded from the fuel cell 2, and hence an increased need for hydrogen from the fuel processor 4, the inlet valve 30 will be closed (e.g. 95%) and the outlet valve 34 opened (e.g. 95%), as needed, to cause the pressure $P_2$ in the vessel 24 to quickly drop to a level closer to $P_1$, the pressure of the steam entering the fuel processor 4. When the pressure $P_2$ in the vessel 24 rapidly drops to $P_1$, or near $P_1$, the water 26 which is at a temperature above its boiling point at pressure $P_1$, will rapidly flash-vaporize in the vessel 24 and flow to the fuel processor 4 via the outlet line 36. The latent heat required to vaporize the steam will come from a sensible temperature drop in the remaining liquid and in the construction materials of the vessel 24. The controller 38 triggers the buffer 20 to produce extra/booster steam when it senses an upward spike in the current, and concurrent drop in the terminal voltage, of the fuel cell. At the same time, the controller 38 signals (39) the primary water vaporizer 14 to increase its output in order for it to be able to accommodate the higher power level required by the fuel cell after the surge to that level has ceased.

The speed of the pump 32, and hence the flow rate of the water therefrom, is controlled via signal 33 from controller 38 to insure that only steam exits the vessel 24 and enters the fuel processor. Alternatively, the operating temperature of the heat exchanger 28 may be increased to insure that only steam exits the vessel 24. To this end, the thermocouple 42 and pressure sensor 44 at the upper end of the vessel 24 measure the temperature and pressure of the fluid thereat and report the measurements to the controller 38 via signals 43 and 45. If the temperature measured by thermocouple 42 exceeds the boiling point of water at the pressure measured by sensor 44 at that location, then it can be inferred that the fluid thereat is all steam (i.e. no liquid water present), and no flow rate or heat exchanger temperature adjustments are needed. On the other hand, if the temperature at the upper end of the vessel 24 (measured by the thermocouple 42) is at the boiling point of water at the pressure measured by the pressure sensor 44, it can be inferred that the fluid at the upper end of the vessel 24 is a two-phase mixture of water and steam, and adjustments are needed to achieve steam only. The thermocouple 46 measures the temperature of the water in the pool 26 and reports that measurement to the controller 38 via signal 35. The temperature of the water will be at a prescribed level above the boiling point of water at pressure $P_1$. If the temperature of the water falls below this prescribed temperature, the pump 32 is slowed to produce hotter steam in the heat exchanger 28 which, in turn, heats the water in the pool 26 as it bubbles therethrough. Alternatively, the operating temperature of the heat exchanger 28 may be increased to provide the heat needed to raise the temperature of the water in pool 26.

The fuel buffer 18 is structured and operated similar to the steam buffer 20, and comprises a pressure vessel 48 containing a pool of liquid hydrogen-containing fuel 47, a liquid level sensor 50, a heat exchanger 52, an inlet valve 54, a pump 56, an outlet valve 58, a thermocouple 60 for the liquid, a thermocouple 62 at the top of the vessel 48, and a pressure sensor 64 also at the top of the vessel 48 adjacent the vessel's exit 51. The fuel buffer 18 is controlled by the same controller 38 as the steam buffer 20. A more compact, unshown, alternative structure has the primary fuel vaporizer 8 integrated into the heat exchanger 52 such that all of the fuel vapor generated passes through the pool 47.

The fuel buffer 18 functions the same as the steam buffer 20 except that the temperature of the fuel pool 48 is maintained above the bubble point of the fuel at pressure $P_3$, the pressure at which the fuel vapor is admitted to the fuel processor 4. More specifically, in the operation of the fuel buffer 18, the vessel 48 is filled with liquid fuel 47 that has been heated to a temperature, and pressurized to a pressure determined by the operating conditions of the fuel processor 4. For example, if the primary vaporizer 8 supplies fuel vapor to the fuel processor 4 at pressure $P_3$, the pressure $P_4$ in the vessel 48 will be maintained significantly higher than the pressure $P_3$, and the temperature of the fuel in the pool 47 in the vessel 48 will be maintained above the bubble point of the fuel water at pressure $P_3$. Preferably, the temperature of the fuel in pool 47 will be at or near the bubble point of the fuel at pressure $P_4$ for optimum fuel buffering. When the fuel cell is operating at substantially steady state conditions (i.e. between power surges), the inlet valve 54 is mostly open (e.g. 95%), the outlet valve 58 mostly closed (e.g. 95%), and the pump 56 pumps the fuel into the vessel 48 at pressure $P_4$. When the fuel cell is operating at substantially steady state, and the level of the liquid fuel in the pool 47 in the vessel 48 is below a prescribed level fresh liquid fuel is added to the pool 47 until the prescribed level is reached. To this end, the pump 56 pumps more liquid fuel into the heat exchanger 52 than the heat exchanger 52 can completely vaporize so that a two phase liquid-fuel/fuel-vapor mixture exits the heat exchanger 52. When the fuel cell is operated at substantially steady state, heated liquid fuel collects in the pool 47 while the fuel vapor collects above the pool 47 and bleeds slowly past the outlet valve 58 into the fuel processor 4 along with the fuel vapor from the primary fuel vaporizer 8. When the liquid fuel in the pool 47 reaches the prescribed level, the flow rate of liquid fuel to the heat exchanger 52 is slowed to the point where only fuel vapor exits the heat exchanger 52. The fuel vapor exiting the heat exchanger 52 bubbles up through the pool 47 to heat the liquid fuel therein. Hence, both liquid fuel and heat are added back into pool 47 and vessel 48 to compensate for the liquid fuel and the heat lost during a power surge. The pressure $P_4$ will be below its prescribed level immediately after a power surge, but will build back up again between surges.

The controller 38 monitors (1) the output (i.e. current and voltage) from the fuel cell 2 via signal 37, (2) the temperature and pressure at the top of the vessel 48 via signals 63 and 65 from sensors 62 and 64, (3) the level of the water in pool 47 via signal 61 from level sensor 50 and (4) the temperature of the pool 47 via signal 49. When the output from the fuel cell indicates a surge in the power demanded from the fuel cell 2, and hence an increased need for hydrogen from the fuel processor 4, the inlet valve 54 will be mostly closed (e.g. 95%) in response to signal 66 from controller 38, and the outlet valve 58 mostly opened (e.g. 95%) in response to signal 68 from controller 38 as needed to cause the pressure $P_4$ in the vessel 48 to quickly drop to a level closer to $P_3$, the pressure of the fuel vapor entering the fuel processor 4 from the primary vaporizer 8. When the pressure $P_4$ in the vessel 48 rapidly drops to $P_3$, the liquid fuel 47 which is at a temperature above its bubble point at pressure $P_3$, will rapidly flash-vaporize in the vessel 48 and flow to the fuel processor 4 via the outlet line 59 in parallel with the fuel 10 supplied by the primary fuel vaporizer 8. The latent heat required to vaporize the liquid fuel will come from a sensible temperature drop in the remaining liquid and in the construction materials of the vessel 48. The controller 38 triggers the fuel buffer 18 to produce extra/booster fuel vapor when it senses an upward spike in the current and concurrent drop in the terminal voltage of the fuel cell. At the same time, the controller 38 signals (53) the primary fuel vaporizer 8 to increase its output in order for it to be able to keep up with the extra steam production from steam buffer 20, and to accommodate the higher power level required by the fuel cell after the surge to that level has ceased.

The speed of the pump 56, and hence the flow rate of the fuel therethrough is controlled via signal 67 so as to insure that only fuel vapor exits the vessel 48 and enters the fuel processor 4. Alternatively, the operating temperature of the heat exchanger 52 may be increased to insure that only fuel vapor exits the vessel 48. To this end, the thermocouple 62 and pressure sensor 64 at the upper end of the vessel 48 measure the temperature and pressure of the fluid thereat, and report the measurements to the controller 38 via signals 63 and 65. If the temperature measured by thermocouple 62 exceeds the dew point of the fuel at the pressure measured by sensor 64 at that location, then it can be inferred that the fluid thereat is all vapor (i.e. no liquid fuel present), where the "dew point" is the temperature where the fuel vapor begins to condense (i.e. the highest boiling constituents of the fuel vapor precipitate). Alternatively the "dew point" could be viewed as the temperature at which the last bit of liquid fuel vaporizes. Regardless of how viewed, above the dew point no flow rate or heat exchanger temperature adjustments are needed. On the other hand, if the temperature at the upper end of the vessel 48 (measured by the thermocouple 62) is between the bubble point and the dew point of the fuel at the pressure measured by the pressure sensor 64, it can be inferred that the fluid at the upper end of the vessel 48 is a two phase mixture of liquid fuel and fuel vapor and pump speed and/or heat exchanger temperature adjustments are needed to achieve fuel vapor out only.

Between power surges, the water in pool 26, and/or the liquid fuel in pool 47, will be replenished by adjusting the flow rate to, and/or heat applied to, the heat exchangers 28 and/or 52 so that the effluents from each are a two-phase mixture of water/steam from heat exchanger 28, and/or liquid-fuel/fuel-vapor from heat exchanger 52, as appropriate. The liquid level sensors 40 and 50 will signal (i.e. 41 and 61) when the liquid level is low and when it has reached its prescribed upper limit. When the prescribed upper limit is reached the sensor will trigger flow rate and/or heat exchanger adjustments that will produce only steam from the heat exchanger 28 and/or fuel vapor from heat exchanger 52. The liquid level sensors 40 and 50 also signal the controller 38 when the liquid levels in the vessels 24 and 48 become depleted. This intelligence is particularly important for operation of the steam buffer 20 to insure that the steam to carbon (i.e. s/c) ratio of the reactants entering the fuel processor 4 does not fall below a prescribed level, which could occur if there were insufficient steam to react with extra fuel being supplied to the fuel processor during power surges. The tolerable s/c ratio for any given system will vary as a function of the temperature, pressure and oxygen-to-carbon ratio in the fuel processor. If the s/c ratio is too low, soot can form and foul the fuel processor Hence, when the water in pool 26 is depleted, the controller 38 will cut back the flow rate of fuel to the fuel processor to keep the s/c ratio above a soot-forming level. Preferably, the amount of steam produced will be determined, and the flow rate of the fuel (and air when applicable) modulated, in direct proportion to the steam rate in order to maintain a prescribed s/c ratio through the full range of operation of the fuel processor.

The controller 38 may either be a controller that is dedicated strictly to the steam/fuel buffering of the present invention, or, preferably, will be part of a central controller that is used to control the many aspects of the entire fuel cell system. Such a central controller 38 contains the necessary hardware and software for receiving inputs, converting inputs to other values correlated to inputs, summing inputs, generating internal signals based on those inputs, conditioning (i.e. integrating/differentiating) the internal signals to provide smooth output signals, and whatever other functions might be needed to control the fuel cell system. The controller 38 may take the form of a conventional general purpose digital, computer-based controller programmed to periodically carry out the described process at predetermined intervals (e.g. every 10 milliseconds). The controller 38 includes such well known elements as (1) a central processing unit (CPU) with appropriate arithmetic and logic circuitry for carrying out arithmetic, logic, and control functions, (2) read-only memory (ROM), (3) read-write random access memory (RAM), (4) electronically programmable read only memory (EPROM), and (5) input and output circuitry which interfaces with the fuel cell and the several sensors, valves and pumps of the steam/fuel vapor buffers, inter alia. The ROM contains the instructions read and executed by the CPU to implement the several processes carried out by the controller 38 including the steam/fuel buffering technique of the present invention. The EPROM contains appropriate look-up tables, and any needed calibration constants, for converting and comparing appropriate inputs/outputs. A specific program for carrying out the invention may be accomplished by standard skill in the art using conventional information processing languages.

The controller 38 contains a first lookup table that correlates the steam and fuel vapor requirements for the fuel processor at various power surge rates and durations, and the inlet/outlet valve settings to achieve those requirements. The values for the first lookup table are determined empirically in the laboratory through a series of experiments wherein a fuel cell system identical to the fuel cell system to be operated according to the present invention is operated under various steady state and power surge conditions, the steam and fuel vapor requirements for those conditions determined and the inlet and outlet valve settings corresponding to those requirements determined and tabulated. The controller 38 contains a second lookup table that correlates the amount of fuel (and air where applicable) that needs to be supplied to the fuel processor for a given amount of steam being provided to the fuel processor to keep the s/c ratio above a soot-forming ratio. The controller 38 contains a third lookup table that correlates (1) the various combinations of temperature and pressure at the exits of the vessels 24 and 48 that yield only steam and/or fuel vapor to (2) the speed of the pumps 32 and 56 (also determined empirically) needed to achieve only steam and fuel vapor thereat for various heat exchanger operating temperatures.

EXAMPLE

Using conventional Steam Tables, a steam buffer 20 is designed to provide steam to a fuel processor 4 at a pressure ($P_1$) of 2.8 bar. Pump 32 pumps water from atmospheric pressure (1 bar) to 4 bar pressure. At low power (e.g. less than 20% full power) steady state conditions, the vessel will have an internal pressure ($P_2$) of 3.9 bar, allowing for a 0.1 bar pressure drop ($\Delta P$) across the mostly-open inlet valve 30 and heat exchanger 28, and a 1.1 bar pressure drop across the mostly-closed outlet valve 34. At steady state conditions, the vessel 24 contains liquid water at its boiling point of 144° C. at pressure $P_2$. When a power surge occurs, there is an increased demand for steam at 2.8 bar ($P_1$). Inlet valve 30 is moved to a more closed position while the outlet valve 34 is moved to a more open position such that the pressure $P_2$ in the vessel 24 quickly drops from 3.9 bar to 2.9 bar (allowing 0.1 bar $\Delta P$ for valve 34). This 1 bar drop in pressure will result in the flash generation of 20.5 grams of steam for each liter of liquid water held at its 144° C. boiling point. Higher amounts of steam per liter of water can be obtained by going to higher pressures. For example, flashing a liter of water from 5.9 bar at its boiling point of 159° C. down to 2.9 bar results in the generation of 51.5 grams of steam, and flashing from 9.9 bar to 2.9 bar with 180° C. water results in the generation of 94.6 grams of steam.

While the invention has been described primarily in terms of certain specific embodiments thereof, it is not intended to be limited thereto, but rather only to the extent set forth hereafter in the claims which follow.

What is claimed is:

1. In a fuel cell system comprising a fuel cell that consumes hydrogen in the electrochemical production of electricity, a fuel processor for producing said hydrogen from a hydrogen-containing fuel and steam, and a steam vaporizer for converting water into said steam and supplying a first quantity of said steam to said fuel processor at a first pressure, wherein the improvement comprises a steam buffer communicating with said fuel processor in parallel with said steam vaporizer for supplying a second quantity of steam to said fuel processor during surges in the electrical power demanded from said fuel cell system, said steam buffer comprising a vessel containing a pool consisting essentially of water under a second pressure greater than said first pressure and at a temperature greater than the boiling point of water at said first pressure, a pump for supplying water to said vessel at said second pressure, a heat exchanger for heating said water to said temperature, an inlet valve communicating said pump with said vessel, an outlet valve communicating said vessel with said fuel processor, and a controller for closing said inlet valve and opening said outlet valve during said surges to rapidly reduce the pressure in said vessel so as to cause said water in said pool to flash vaporize and provide said second quantity.

2. In a fuel cell system comprising a fuel cell that consumes hydrogen in the electrochemical production of electricity, a fuel processor for producing said hydrogen from a liquid, hydrogen-containing fuel and water, and a fuel vaporizer for converting said hydrogen-containing fuel to a vapor and supplying a first quantity of said vapor to said fuel processor at a first pressure, wherein the improvement comprises a fuel buffer communicating with said fuel processor in parallel with said fuel vaporizer for supplying a second quantity of fuel vapor to said fuel processor during surges in the electrical power demanded from said fuel cell system, said fuel buffer comprising a vessel containing a pool of fuel consisting essentially of said liquid hydrogen-containing fuel under a second pressure greater than said first pressure and at a temperature greater than the dew point of said hydrogen-containing fuel at said first pressure, a pump for supplying said liquid hydrogen-containing fuel to said vessel at said second pressure, a heat exchanger for heating said liquid hydrogen-containing fuel to said temperature, an inlet valve communicating said pump with said vessel, an outlet valve communicating said vessel with said fuel processor, and a controller for closing said inlet valve and opening said outlet valve during said surges to rapidly reduce the pressure in said vessel so as to cause said liquid hydrogen-containing fuel in said pool to flash vaporize and provide said second quantity.

3. A method of operating a fuel cell system having a fuel cell that consumes hydrogen in the electrochemical production of electricity and a fuel processor for producing said hydrogen from a hydrogen-containing fuel and water, comprising the steps of vaporizing said water to provide a first quantity of steam to said fuel processor at a first pressure when operating said fuel cell at a first power level, and supplying a second quantity of steam to said fuel processor in parallel with said first quantity to supplement said first quantity during surges in the electrical power to a higher power level than said first power level by providing a pool consisting essentially of water at a second pressure greater than said first pressure and at a temperature greater than the boiling point of water at said first pressure and rapidly reducing the pressure on said pool during said surges from said second pressure to said first pressure to flash vaporize the water in said pool and provide it to said fuel processor.

4. A method according to claim 3 comprising replenishing said pool by providing a two phase mixture of water and steam to said vessel between said surges.

5. A method according to claim 3 wherein said temperature is the boiling point at about said second pressure.

6. A method according to claim 4 including bubbling steam supplied to said vessel through said pool to heat said pool between said surges.

7. A method of operating a fuel cell system having a fuel cell that consumes hydrogen in the electrochemical production of electricity and a fuel processor for producing said hydrogen from a liquid, hydrogen-containing fuel and water, comprising the steps of vaporizing said fuel in a fuel vaporizer to provide a first quantity of fuel vapor to said fuel processor at a first pressure when operating said fuel cell at a first power level, and supplying a second quantity of fuel vapor to said fuel processor in parallel with said fuel vaporizer to supplement said first quantity during surges in the electrical power to a higher power level than said first power level by providing a pool of fuel consisting essentially of said liquid, hydrogen-containing fuel at a second pressure greater than said first pressure and at a temperature greater than the dew point of said fuel at said first pressure, and rapidly reducing the pressure on said pool from said second pressure to said first pressure to flash vaporize the fuel in said pool and provide it to said fuel processor.

8. A method according to claim 7 comprising replenishing said pool by providing a two phase liquid-vapor mixture of said fuel to said vessel between said surges.

9. A method according to claim 8 including bubbling fuel vapor supplied to said vessel through said pool to heat said pool between said surges.

10. A method according to claim 7 wherein said temperature is the bubble point at about said second pressure.

* * * * *